US012634636B2

(12) United States Patent
Joet et al.

(10) Patent No.: US 12,634,636 B2
(45) Date of Patent: May 19, 2026

(54) ELECTROMECHANICAL SYSTEM COMPRISING CAPACITIVE MEASUREMENT OR ACTUATION MEANS

(71) Applicant: COMMISSARIAT Á L'ENERGIE ATOMIQUE ET AUX ENERGIES ALTERNATIVES, Paris (FR)

(72) Inventors: Loïc Joet, Grenoble (FR); Samer Dagher, Grenoble (FR)

(73) Assignee: COMMISSARIAT ÀL' ENERGIE ATOMIQUE ET AUX ENERGIES ALTERNATIVES, Paris (FR)

( * ) Notice: Subject to any disclaimer, the term of this patent is extended or adjusted under 35 U.S.C. 154(b) by 281 days.

(21) Appl. No.: 18/400,701

(22) Filed: Dec. 29, 2023

(65) Prior Publication Data

US 2024/0223967 A1 Jul. 4, 2024

(30) Foreign Application Priority Data

Dec. 30, 2022 (FR) ....................................... 2214687

(51) Int. Cl.
*H04R 19/04* (2006.01)
*H04R 19/02* (2006.01)

(52) U.S. Cl.
CPC ............. *H04R 19/04* (2013.01); *H04R 19/02* (2013.01); *H04R 2201/003* (2013.01); *H04R 2400/11* (2013.01)

(58) Field of Classification Search
CPC .. H04R 19/04; H04R 19/02; H04R 2201/003; H04R 2400/11; B81B 3/0086;
(Continued)

(56) References Cited

U.S. PATENT DOCUMENTS 7,085,122 B2 * 8/2006 Wu .......................... H01G 5/06 361/290
7,911,672 B2 * 3/2011 Zhou ....................... B81B 3/004 359/224.1

(Continued)

FOREIGN PATENT DOCUMENTS

EP 3 975 588 A1 3/2022
FR 3 059 659 B1 5/2019

(Continued)

OTHER PUBLICATIONS

Search Report as issued in French Patent Application No. FR2214687, dated Jul. 24, 2023.

(Continued)

*Primary Examiner* — Angelica M McKinney
(74) *Attorney, Agent, or Firm* — CUSHMAN PARTNERS, LLC

(57) ABSTRACT

An electromechanical system includes a frame; a movable element; a capacitive measurement or actuation system including a movable electrode and at least one fixed electrode, referred to as a counter-electrode, the movable electrode including a membrane and a membrane rigidifying structure; a device for transmitting movement between the movable element and the movable electrode, the transmission device being rotatably movable relative to the frame by a plurality of pivot hinges; and an elastic device connected to the movable electrode and configured to generate an elastic force which opposes movement of the movable electrode; the rigidifying structure of the movable electrode being secured to the transmission device and anchored to the transmission device at at least one part of the pivot hinges.

16 Claims, 5 Drawing Sheets

(58) Field of Classification Search
CPC ....... B81B 3/0094; B81B 3/0097; B81B 5/00; B81B 3/0027; B81B 7/02; B81B 7/0035; B81B 7/007; B81B 2201/0257
See application file for complete search history.

(56) References Cited

U.S. PATENT DOCUMENTS

| | | | | |
|---|---|---|---|---|
| 10,807,858 B2 * | 10/2020 | Joet | ........................ | H04R 19/02 |
| 2016/0277847 A1 * | 9/2016 | Joet | ........................ | G01L 9/08 |
| 2021/0021944 A1 * | 1/2021 | Joet | ........................ | H04R 17/02 |

FOREIGN PATENT DOCUMENTS

| | | |
|---|---|---|
| FR | 3 114 584 B1 | 9/2022 |
| WO | WO 2008/078182 A2 | 7/2008 |

OTHER PUBLICATIONS

Search Report as issued in French Patent Application No. FR2214688, dated Jul. 21, 2023.

* cited by examiner

ELECTROMECHANICAL SYSTEM COMPRISING CAPACITIVE MEASUREMENT OR ACTUATION MEANS

CROSS-REFERENCE TO RELATED APPLICATIONS

This application claims priority to French Patent Application No. 2214687, filed Dec. 30, 2022, the entire content of which is incorporated herein by reference in its entirety.

FIELD

The technical field of the invention is that of electromechanical systems, especially of the microelectromechanical systems (MEMS) or nanoelectromechanical systems (NEMS) type. The invention more particularly relates to an electromechanical system comprising a movable element, capacitive measurement or actuation means and a device for transmitting movement between the movable element and the capacitive measurement or actuation means. Such a system may be employed as an electroacoustic transducer (for example microphone, loudspeaker . . . ) or as a differential pressure sensor.

BACKGROUND

Microelectromechanical or nanoelectromechanical microphones represent a rapidly expanding market, especially due to the development of nomadic devices, such as tablets, smartphones and other connected objects, in which they are gradually replacing electret microphones.

Microphones measure a rapid variation in atmospheric pressure, also known as acoustic pressure. Therefore, they include at least one part in contact with the outside.

Most MEMS or NEMS microphones manufactured today are capacitive detection microphones. FIG. 1 represents one example of a capacitive detection microphone 1, described in patent FR3114584B1.

The microphone 1 comprises a frame (not represented) at least partly defining a first zone 11 and a second zone 12, an element 13 movable relative to the frame and a device 14 for transmitting movement between the first zone 11 and the second zone 12. The first and second zones 11-12 of the microphone 1 are sealingly insulated from each other.

The movable element 13, also called piston, is in contact with the first zone 11. It comprises a membrane 131 and a membrane rigidifying structure 132. The role of the membrane 131 of the piston 13 is to collect over its entire surface a pressure difference between its two faces, in order to deduce a variation in atmospheric pressure therefrom. One side of the membrane 131 is subjected to atmospheric pressure (the variation of which is desired to be detected) and an opposite side of the membrane 131 is subjected to a reference pressure.

In addition, the microphone 1 comprises capacitive detection means 15 disposed in the second zone 12. These capacitive detection means 15 allow measurement of the displacement of the piston 13, and therefore the difference in pressure between its two faces. They preferably comprise a movable electrode 151 and at least one fixed electrode facing the movable electrode 151. The electrodes form armatures of a capacitor whose capacitance varies as a function of the displacement of the piston 13.

The transmission device 14 is rotatably mounted relative to the frame by means of several pivot hinges 16. The transmission device 14 comprises two first transmission arms 141 extending in the first zone 11, two second transmission arms 142 extending in the second zone 12 and two transmission shafts 143 partly extending in the first zone 11 and partly in the second zone 12. Each transmission shaft 143 connects a first transmission arm 141 to a second transmission arm 142.

Each first transmission arm 141 comprises a first end coupled to the piston 13 and a second, opposite end coupled to the transmission shaft 143 associated therewith. Each second transmission arm 142 comprises a first end coupled to the movable electrode 151 of the capacitive detection means 15 and a second, opposite end coupled to the transmission shaft 143 associated therewith.

Patent FR3059659B1 describes a capacitive detection microphone similar to that of FIG. 1. The capacitive detection means comprise a movable electrode and two fixed electrodes between which the movable electrode is disposed. The electrodes form armatures of two capacitors whose capacitances vary in opposite directions as a function of the displacement of the piston. The measurement of the piston displacement is therefore a differential measurement.

To achieve such a differential measurement, the capacitors are charged beforehand by applying a DC bias voltage between the movable electrode and the fixed electrodes through a high resistance. Displacement of the piston results in a variation in capacitance, and hence a variation in voltage between the fixed electrodes (the capacitor charge being substantially constant at audible frequencies, typically above 100 Hz) which can be read by an instrumentation amplifier.

One drawback of these capacitive detection microphones is that energy is lost in the deformation of the transmission device 14 and the frame of the movable electrode 151, which represents a loss of useful signal upon detecting dynamic pressure variations.

In addition, these capacitive detection microphones can become failing due to a movable electrode "pull-in" phenomenon, which is common to all electromechanical systems that include capacitive measurement or actuation means. This pull-in phenomenon is caused by the electrostatic force, which tends to bring the movable electrode closer to the fixed electrode (or to one of the fixed electrodes) and which depends on the square of the bias voltage. The electrostatic force, which also depends on the displacement of the movable electrode, can be approximated to first order by a constant force plus the force exerted by a spring of negative stiffness for small displacements.

To avoid (to a certain extent) this pull-in phenomenon, an elastic force is opposed to the electrostatic force. This elastic force can be generated by springs that connect the frame of the movable electrode to the microphone frame. The greater the stiffness of the springs, the greater the voltage at which the electrostatic force overcomes the elastic force (the so-called "pull-in voltage") and the higher the voltage at which the movable electrode can be biased (the sensitivity of the microphone increases with the bias voltage).

The linear component (negative stiffness) of the electrostatic force, as well as the associated pull-in risk, is maximal in the static regime, when the voltage applied across the capacitor is constant. They impose a high stiffness in opposition. On the other hand, when detecting dynamic pressure variations (thus in dynamic regime), the linear component of the electrostatic force exerted on the movable electrode is less, or even zero, and does not help to make the system more flexible. The piston should then collect enough energy to compress the springs and move the movable electrode. The stiffness of the springs introduced to counteract pull-in of the movable electrode therefore represents a useful signal loss upon detecting dynamic pressure variations.

Thus, increasing pull-in voltage by increasing stiffness and decreasing energy losses in electromechanical systems with capacitive detection or capacitive actuation are antinomic.

SUMMARY

There is therefore a need to provide an electromechanical system with capacitive detection or capacitive actuation with a better compromise between pull-in voltage and energy losses.

According to a first aspect of the invention, this need tends to be satisfied by providing an electromechanical system comprising:

- a frame;
- an element movable relative to the frame, in contact with a first zone;
- capacitive measurement or actuation system comprising an electrode movable relative to the frame, located in a second zone sealingly insulated from the first zone, and at least one electrode fixed relative to the frame, called a counter-electrode, the movable electrode comprising a membrane and a membrane rigidifying structure;
- a device for transmitting movement between the movable element and the movable electrode, the transmission device being rotatably movable relative to the frame by means of a plurality of pivot hinges; and
- an elastic device connected to the movable electrode and configured to generate an elastic force which opposes the movement of the movable electrode.

The electromechanical system is remarkable in that the rigidifying structure of the movable electrode is secured to the transmission device and anchored to the transmission device at at least one part of the pivot hinges.

The term "secured" means that there is no relative movement between the rigidifying structure of the movable electrode and the transmission device. More particularly, there is no transformation of movement between the transmission device and the movable electrode (for example from a rotation of the transmission device to a translation of the movable electrode) and therefore no loss of energy associated with this transformation.

The transmission chain of mechanical forces between the movable element and the movable electrode (this chain comprising the different elements of the transmission device) is reduced to a minimum, thanks to the anchoring of the movable electrode at the pivot hinges. The energy losses due to (elastic) deformation of the transmission device are therefore reduced, which in the case of a microphone or a differential pressure sensor results in a higher useful signal output from the capacitive detection system (greater displacement of the movable electrode).

The energy losses are thus restricted to the (useful) deformation of the elastic device for combatting pull-in of the movable electrode (so-called "anti-pull-in" device), by reducing the (unnecessary) deformation of the transmission device.

Further to the characteristics just discussed in the preceding paragraphs, the electromechanical system according to the invention may have one or more of the following additional characteristics, considered individually or according to any technically possible combinations:

- the transmission device comprises first elements extending in the first zone and second elements partly extending in the first zone and partly in the second zone, and the rigidifying structure of the movable electrode is connected to the first elements of the transmission device through the second elements;
- the first elements of the transmission device have a thickness between 5 μm and 800 μm, and in an embodiment, between 50 μm and 200 μm;
- the first elements of the transmission device comprise two transmission arms and a transverse beam connecting the two transmission arms, each of the transmission arms comprising a first end coupled to the movable element and a second end secured to the transverse beam;
- the first elements of the transmission device comprise:
  - a transmission shaft having a longitudinal axis of rotation; and
  - a plurality of transmission arms, each of the transmission arms comprising a first end coupled to the movable element and a second end secured to the transmission shaft;
- the rigidifying structure of the movable electrode being secured to the transmission shaft, whereby the movable electrode is rotatably movably mounted about the first longitudinal axis of rotation;
- the rigidifying structure of the movable electrode comprises a plurality of beams extending in parallel to each other and at least some of the beams are anchored to the transmission device, each beam of the at least one part being anchored at a pivot hinge corresponding to the beam;
- each beam of the at least one part is anchored to the transmission device at half its length;
- each beam of the at least one part has a width that decreases with the distance from the corresponding pivot hinge;
- the number of beams is greater than or equal to the number of pivot hinges of the at least one part;
- each pivot hinge of the at least one part may comprise a sealed insulation element capable of elastic deformation and ensuring sealing between the first zone and the second zone, the elastic device comprising the sealed insulation element of the at least one part of the pivot hinges;
- each pivot hinge of the at least one part further comprises two torsion blades each extending between a portion of the frame and the rigidifying structure of the movable electrode, the elastic device further comprising the torsion blades of the at least one part of the pivot hinges;
- the electromechanical system further comprises a system or device for stopping pull-in of the movable electrode before it touches the fixed electrode and creates a short circuit, the system or device being located at one end or the ends of one or more beams;
- the capacitive measurement or actuation system comprises two counter-electrodes fixed relative to the frame, at least one part of the membrane of the movable electrode being located between the two counter-electrodes;
- each counter-electrode comprises a first portion and a second portion located on either side of the membrane and on either side of the pivot hinges of the at least one part, the first and second portions of each counter-electrode being electrically connected;
- the first portion of each counter-electrode comprises a plurality of blocks separated by the rigidifying structure of the movable electrode and each block of the first portion is electrically connected to the second portion of the counter-electrode by a connector passing between two successive pivot hinges of the at least one part; and the pivot hinges of the at least one part are aligned with each other.

BRIEF DESCRIPTION OF THE FIGURES

Further characteristics and benefits of the invention will be apparent from the description given below, by way of indicating and in any way limiting purposes, with reference to the appended figures, in which.

For the sake of clarity, identical or similar elements are marked with identical reference signs throughout the figures.

DETAILED DESCRIPTION

FIGS. 2, 3 and 4A to 4C represent part of an electromechanical system 2 with capacitive detection or capacitive actuation according to a first embodiment of the invention. This electromechanical system 2 may form an electroacoustic transducer, for example a microphone or a loudspeaker, or a differential pressure sensor. In the following description, the example of a microphone with capacitive detection will be considered.

Figure 1:
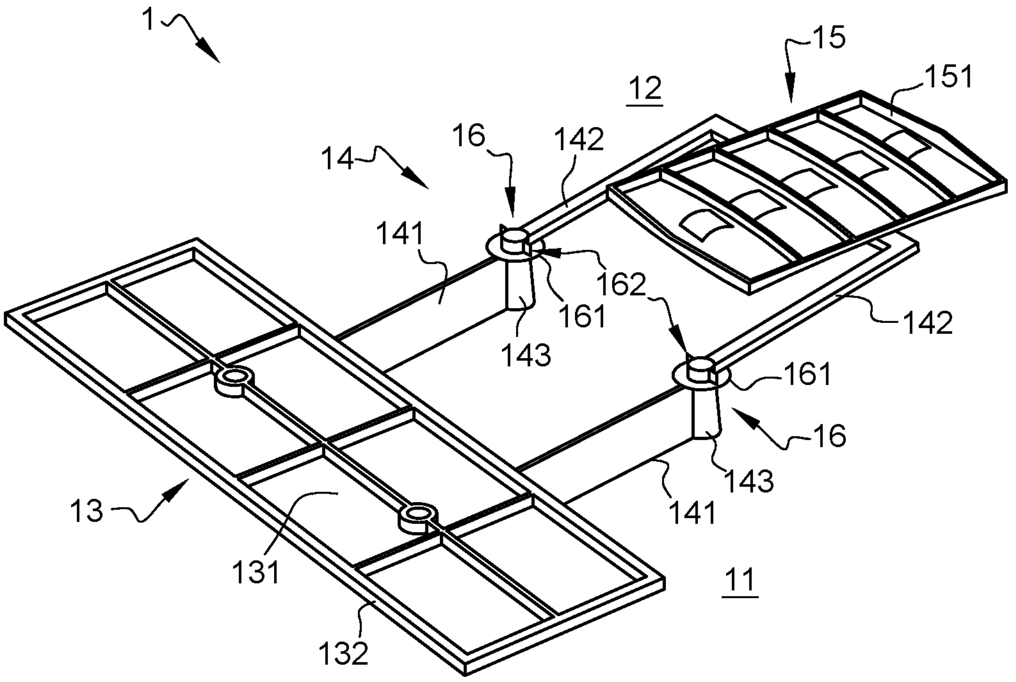
FIG. 1 is a partial perspective view of a capacitive detection microphone according to prior art.

Reference is made to FIG. 1 for those elements of the electromechanical system 2 not represented in FIGS. 2, 3 and 4A to 4C.

Like the microphone 1 in FIG. 1, the electromechanical system 2 comprises:

- a frame 10;
- an element 13 movable relative to the frame 10, in contact with a first zone 11;
- capacitive detection (or measurement) system 15' comprising an electrode 152 movable relative to the frame, the movable electrode 152 being located in a second zone 12 sealingly insulated from the first zone 11; and
- a device 14' for transmitting a movement between the movable element 13 and the movable electrode 152 of the capacitive detection system 15', in other words between the first zone 11 and the second zone 12.

Figure 2:
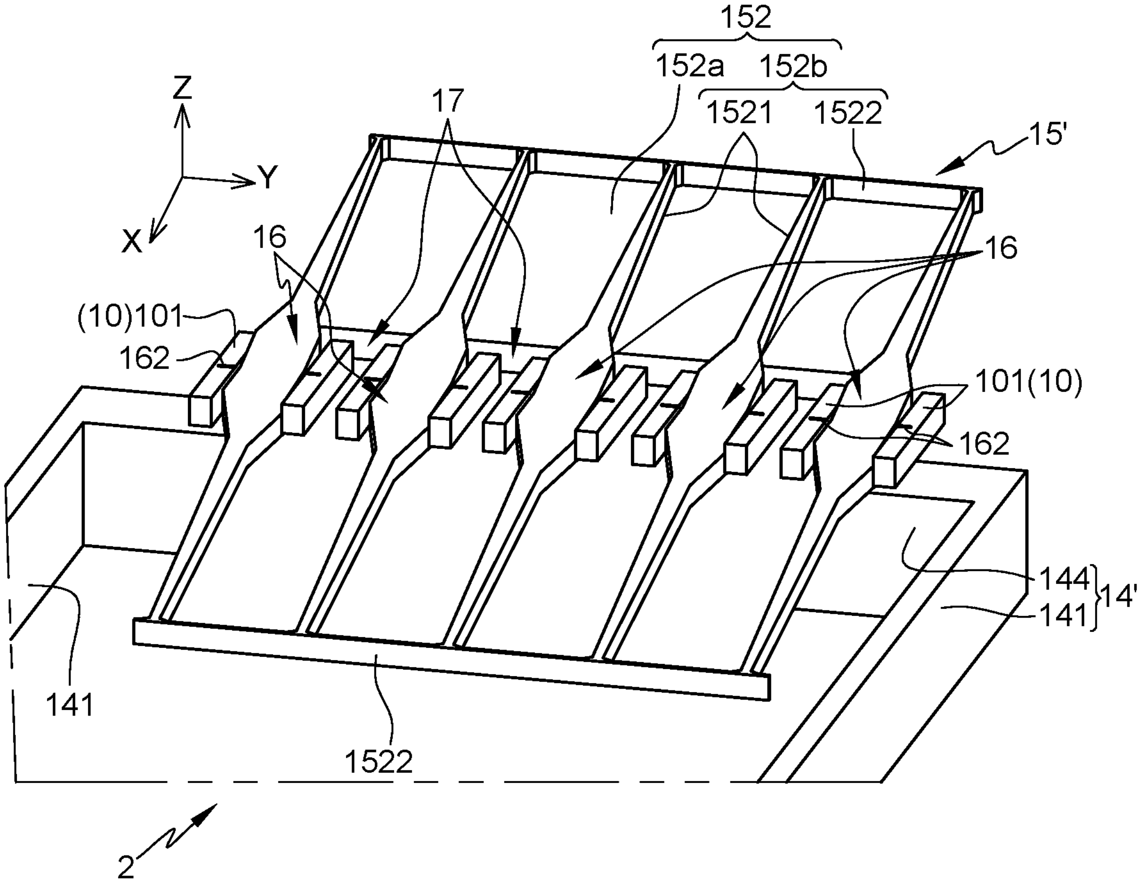
FIG. 2 is a partial perspective view of an electromechanical system according to a first embodiment of the invention, this electromechanical system comprising capacitive detection or actuation system.
Figure 3:
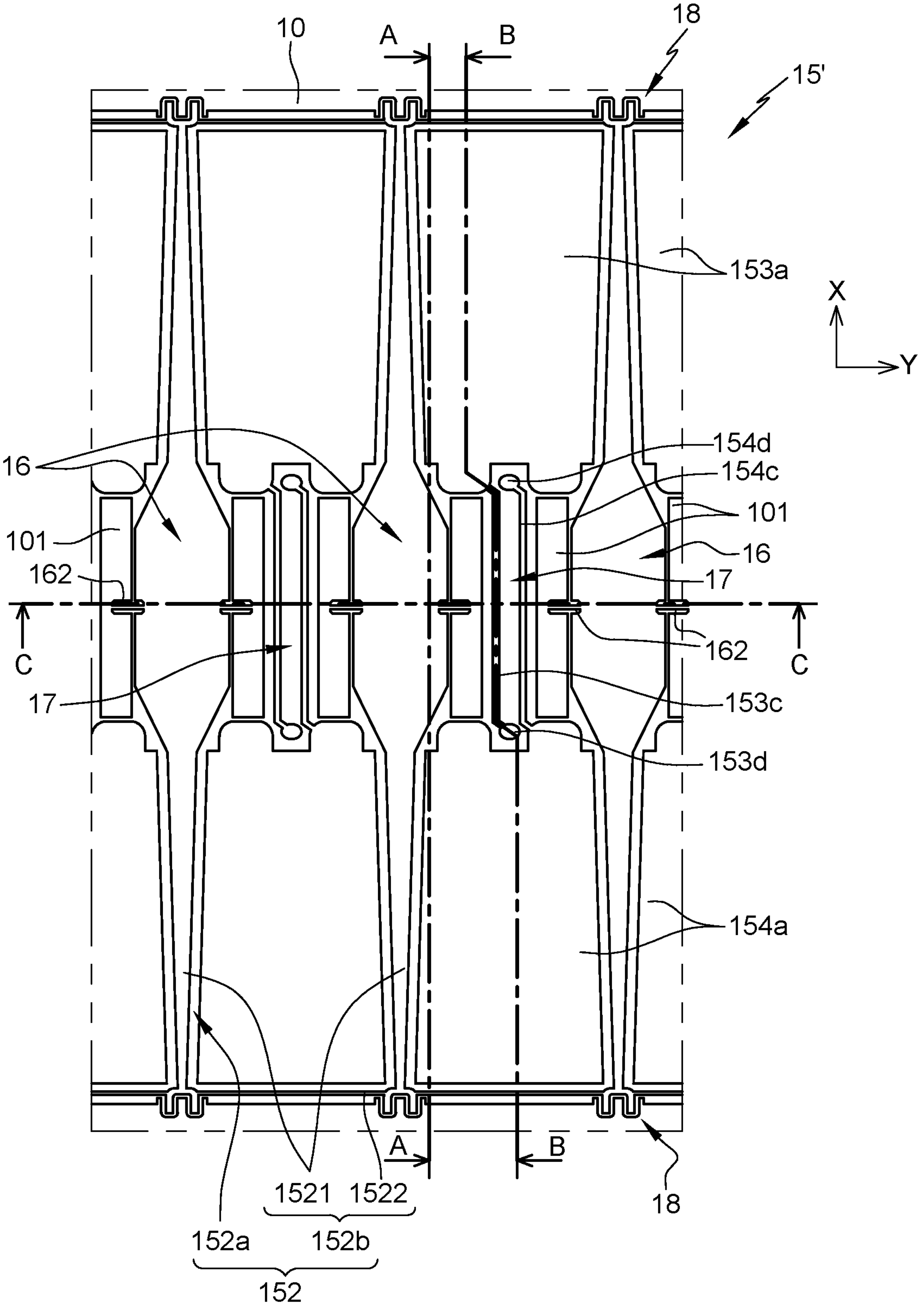
FIG. 3 is a top view of the electromechanical system of FIG. 2, showing part of the capacitive detection or actuation system.
Figure 4A:
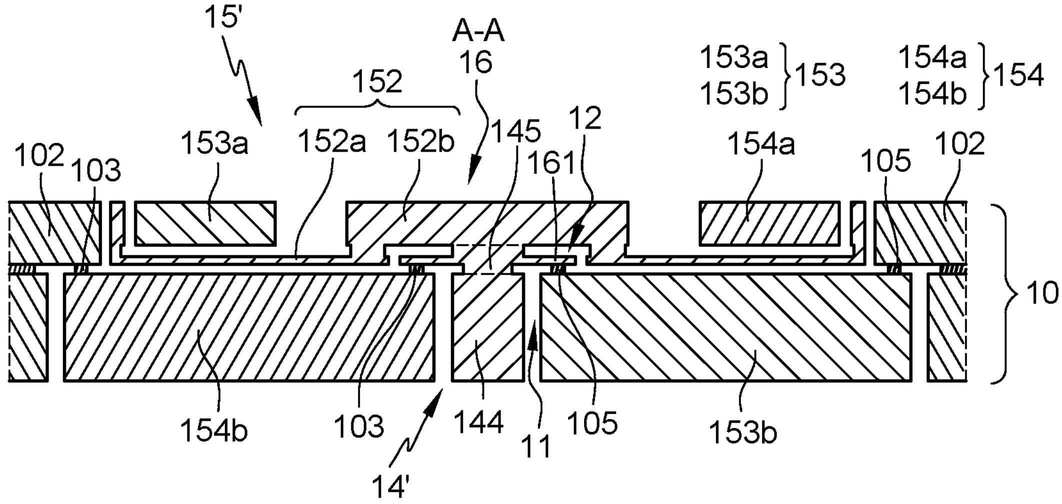
FIG. 4A is a cross-sectional view of the electromechanical system along sectional plane A-A of FIG. 3.
Figure 4B:
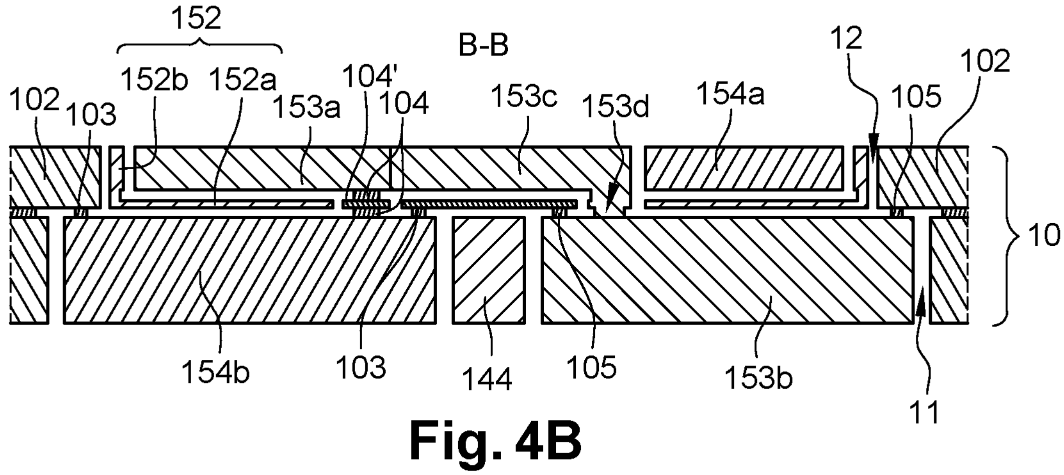
FIG. 4B is a cross-sectional view of the electromechanical system along sectional plane B-B of FIG. 3.
Figure 4C:
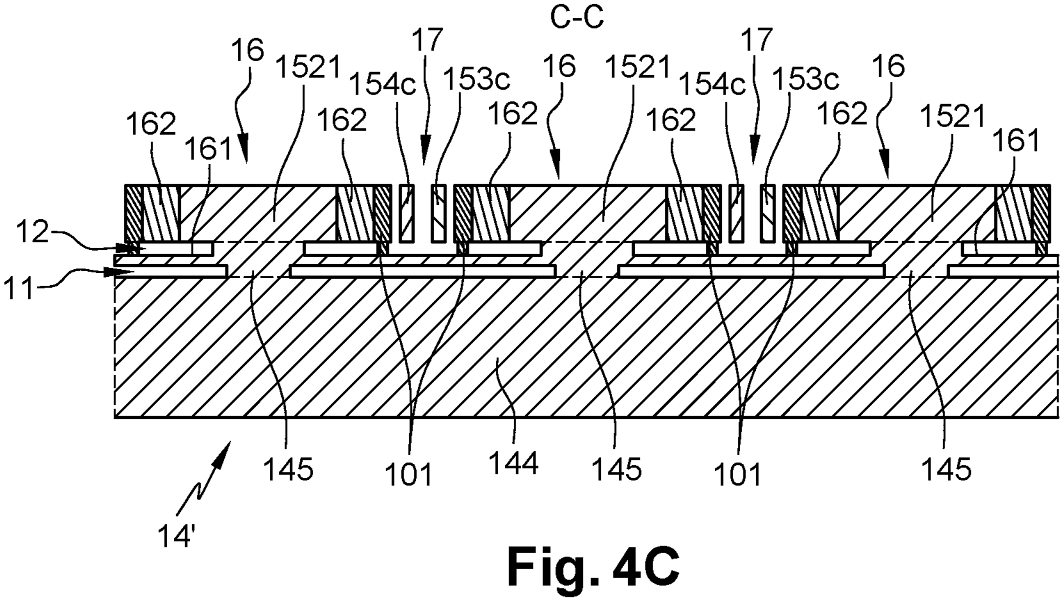
FIG. 4C is a cross-sectional view of the system along sectional plane C-C of FIG. 3.

FIG. 2 is a perspective view showing first portions 101 of the frame 10, only a part of the transmission device 14' and the movable electrode 152 of the capacitive detection system 15'. FIG. 3 is a top view showing only a part of the capacitive detection system 15' (including the movable electrode 152). FIGS. 4A to 4C are different cross-sectional views of the electromechanical system 2, respectively along the cross-sectional planes A-A, B-B and C-C represented in FIG. 3. They partly represent the frame 10, the transmission device 14' and the capacitive detection system 15'.

The movable element 13, hereinafter referred to as the piston, may be rotatably or translationally movable (relative to the frame). It can be identical to that described with reference to FIG. 1. In particular, it may comprise a membrane 131 and a structure 132 for rigidifying the membrane 131, also called a skeleton or armature.

The membrane 131 of the piston 13 can partly delimit a closed volume known as the reference volume, where a reference pressure prevails. It separates this reference volume from a cavity open to the external environment, in this case air. One face of the membrane 131 is therefore subjected to the reference pressure and an opposite face of the membrane 131 is subjected to the atmospheric pressure (the variation of which is desired to be detected in the case of a microphone). Alternatively, the reference volume may be quasi-closed, in that there is a trench around the piston (which is trimmed). This trench allows the piston to move and allows air to leak between the reference volume and the outside. This leakage is small so that the pressures can slowly equalise, so that only low frequency (<100 Hz) pressure variations are filtered out.

The first zone 11 encompasses the cavity open to the external environment, subject to atmospheric pressure, and the reference volume subjected to the reference pressure.

The capacitive detection system 15' allows measurement of displacement of the piston 13, and therefore pressure difference between its two faces. In addition to the movable electrode 152, they comprise at least one electrode fixed relative to the frame 10, called the "counter-electrode" and facing the movable electrode 152. The movable and fixed electrodes form the armatures of one or more capacitors whose capacitance varies as a function of the displacement of the piston 13.

The second zone 12 is beneficially a controlled atmosphere chamber to reduce viscous friction phenomena and acoustic noise associated therewith. By "controlled atmosphere chamber», it is meant a chamber under a reduced pressure, typically less than 10 mbar, and in an embodiment less than 1 mbar. Thus, the second zone 12 is subjected to a pressure much lower atmospheric pressure or the reference pressure.

With reference to FIG. 2, the movable electrode 152 comprises a membrane **152*a* and a structure 152*b* for rigidifying the membrane 152*a*. The rigidifying structure 152*b* of the movable electrode 152, in an embodiment, comprises a plurality of first beams 1521 extending in parallel to each other. It may further comprise second beams 1522 connecting the first beams 1521 at their ends. The first beams 1521 extend in a first direction X, and in an embodiment from a first edge to an opposite second edge of the movable electrode 152. They are beneficially evenly spaced from each other, to rigidify the membrane 152*a* uniformly. The second beams 1522, in an embodiment, extend in a second direction Y perpendicular to the first direction X (thus perpendicularly to the first beams 1521**). An orthogonal coordinate system is thus defined, with a third direction Z perpendicular to the first and second directions X-Y.

The movable electrode 152 beneficially has one or more planes of symmetry, for example a plane parallel to the plane YZ (and therefore perpendicular to the first beams 1521) and another plane parallel to the plane XZ.

The transmission device 14' is rotatably mounted with respect to the frame 10 by means of several pivot hinges 16. It comprises first elements extending in the first zone 11, for example two transmission arms 141 and a transverse beam 144 connecting the two transmission arms 141. In an embodiment, the transmission arms 141 extend in the first direction X and the transverse beam 144 extends in the second direction Y. Each of the transmission arms 141 comprises a first end coupled to the piston 13 (see FIG. 1) and a second end secured to the transverse beam 144 (see FIG. 2).

The pivot hinges 16, for example 5 in number in FIG. 2, are in an embodiment, aligned, here in the second direction Y. More particularly, they are located vertically to the transverse beam 144. They are beneficially evenly spaced from each other.

One feature of the electromechanical system 2 is that the rigidifying structure 152*b* of the movable electrode 152 is secured to the transmission device 14'. The movable electrode 152 therefore moves relative to the frame 10 with the same rotational movement as the transmission device 14'. Here it rotates about an axis of rotation parallel to the second direction Y. The electromechanical system 2 is therefore devoid of motion transformation elements between the transmission device 14' and the movable electrode 152, such as torsion blades for switching from rotation to translation. As a result, no energy is lost in these transformation elements (for example, by deformation of the torsion blades).

Another feature of the electro-mechanical system 2 is that the rigidifying structure 152*b* of the movable electrode 152 is anchored, or fused, to the transmission device 14' at the pivot hinges 16. Compared to the microphone 1 of FIG. 1, the electrostatic system 2 is therefore devoid of second transmission arms 142 extending into the second zone 12.

More particularly, the rigidifying structure 152*b* of the movable electrode 152 is connected to the first elements of the transmission device 14', and more particularly to the transverse beam 144, through second elements 145 visible in FIGS. 4A and 4C. These second elements 145 of the transmission device 14', called pillars, are similar to the transmission shafts 143 of FIG. 1 as they partly extend into the first zone 11 and partly into the second zone 12. Indeed, sealing between the first zone 11 and the second zone 12 also takes place at the pivot hinges 16.

The transmission device 14' is thus reduced to the first elements extending exclusively in the first zone 11 (here the transmission arms 141 and the transverse beam 144) and to the second elements 145 which extend partly in the first zone 11 and partly in the second zone 12. This reduction of the transmission device 14' makes it possible to limit energy losses. Especially, there are no longer any losses through deformation of the second transmission arms 142.

Furthermore, the first elements of the transmission device 14' are relatively rigid (much more so than the second transmission arms 142 of the microphone 1), as they have a significant thickness, in an embodiment between 5 μm and 800 μm, and in an embodiment between 50 μm and 200 μm. They are beneficially formed by anisotropic etching of a silicon substrate. This substrate can be thinned to a thickness of between 50 μm and 200 μm. Alternatively, the first elements of the transmission device 14' are formed by an epitaxial layer with a thickness between 5 μm and 40 μm.

The electromechanical system 2 is particularly compact, as several functions, namely rotating the transmission device 14', sealing between both zones 11-12 and connecting to the movable electrode 152, are carried out in the same place.

Anchorage between the rigidifying structure 152*b* and the transmission device 14' is in an embodiment achieved by means of the first beams 1521. At least some of them are fused to the transmission device 14', each at a corresponding pivot hinge 16. The anchoring point of each first beam 1521 is beneficially located at half its length. Thus, the axis of rotation is located in one of the planes of symmetry of the movable electrode 152 (the one perpendicular to the first beams 1521). The length of the first beams 1521 is measured in the first direction X, while their width is measured in the second direction Y.

Each first beam 1521 fused with the transmission device 14' beneficially has a width that decreases with the distance from the corresponding pivot hinge 16. In other words, the width of the first beams 1521 is maximum at the pivot hinges 16. Thus, the rigidifying structure 152*b* is most rigid where it is most mechanically stressed, that is near the axis of rotation. This helps to reduce energy losses by deformation, without negatively impacting inertia of the movable electrode 152 and therefore the resonant frequency of the electromechanical system 2.

In this first embodiment of the electromechanical system 2, each of the first beams 1521 of the rigidifying structure 152*b* is fused to the transmission device 14'. In other words, each first beam 1521 is associated with a pivot hinge 16. The number of pivot hinges 16 is therefore at least equal to the number of first beams 1521. This arrangement allows a space 17 to be created between two successive pivot hinges 16.

The frame 10 may comprise, for each pivot hinge 16, two separate first portions 101 disposed on either side of the first beam 1521 associated with the pivot hinge. The first beam 1521 is in an embodiment connected to each of the first portions 101 of the frame 10 through a torsion blade 162.

As is represented in FIGS. 3, 4A-4C, the capacitive detection system 15' in an embodiment comprises two counter-electrodes 153-154: a first so-called positive counter-electrode 153 and a second so-called negative counter-electrode 154. In an embodiment, at least one part of the membrane 152 of the movable electrode is located between the two counter-electrodes 153-154 (see FIGS. 4A-4C). The movable electrode 152 and the counter-electrodes 153-154 thus form armatures of two capacitors whose capacitances vary in opposite directions. A differential measurement of the displacement of the piston 13 can thus be obtained. The surfaces of the counter-electrodes 153-154 facing the movable electrode 152 are beneficially identical, by virtue of a symmetry of the capacitive detection system 15' with respect to the pivot hinges 16 (the plane of symmetry is coincident with the sectional plane C-C).

Beneficially, each of the counter-electrodes 153, 154 comprises a first portion 153*a*, 154*a* and a second portion 153*b*, 154*b* located on either side of the membrane 152*a* of the movable electrode 152 and on either side of the pivot hinges 16. The first so-called upper portion 153*a*, 154*a*, and the second so-called lower portion 153*b*, 154*b*, of a same counter-electrode are electrically connected. This arrangement allows a fully differential measurement to be obtained, even if the distance between the membrane 152*a* and the upper portions 153*a*-154*a* of the counter-electrodes (referred to as the upper gap) is different from the distance between the membrane 152*a* and the lower portions 153*a*-154*a* of the counter-electrodes (lower gap).

The lower portions 153*b*-154*b* of the counter-electrodes 153-154 may extend under the first beams 1521 of the rigidifying structure 152*b* on either side of the pivot hinges 16. In contrast, the upper portions 153*a*-154*a* of the counter-electrodes 153-154 are in an embodiment each divided into a plurality of blocks (or sub-portions) separated by the first beams 1521, as illustrated in FIG. 3. As the upper portions 153*a*-154*a* of the counter-electrodes 153-154 are inscribed in the rigidifying structure 152*b* of the movable electrode 152, their surface area facing the membrane 152*a* is smaller than that of the lower portions 153*b*-154*b*.

Each block of the upper portion 153*a* of the first counter-electrode 153 may be electrically connected to the lower portion 153*b* of this same counter-electrode by a first connector 153*c* and a first conductive via 153*d*. Similarly, each block of the upper portion 154*a* of the second counter-electrode 154 may be electrically connected to the lower portion 154*b* of this same counter-electrode by a second connector 154*c* and a second conductive via 154*d*.

The first and second connectors 153*c*-154*c* beneficially extend into the space 17 located between two pivot hinges 16. Thus, the electrical connection of the upper and lower portions of a same counter-electrode is simplified and does not increase the overall space of the capacitive detection system 15'.

Alternatively, the individual blocks of an upper counter-electrode portion may be connected directly to each other, for example at the periphery of the movable electrode 152.

With reference to FIGS. 4A and 4B, the lower portions 153*b*-154*b* of the counter-electrodes 153-154 are in an embodiment secured to an annular portion 102 of the frame 10, located at the periphery of the movable electrode 152, by means of annular seals 103, 105 made of an electrically insulating material (one annular seal per lower portion 153*b*, 154*b*). These annular seals 103, 105, for example made of silicon oxide, further provide sealing between the first zone 11 and the second zone 12.

In addition, each of the blocks of the upper portions 153*a*, 154*a* of the counter-electrodes 153-154 may be secured to the underlying lower portion 154*b*, 153*b* by (at least) two electrically insulating pillars 104, in an embodiment formed by the same material as that of the annular seals 103, 105. The pillars 104 may be separated in pairs by a residual layer 104' formed by the same material as that of the membrane 152*a* of the movable electrode 152, for example silicon. The thickness of the pillars 104 is then equal to the upper gap and the lower gap. Otherwise, there is only one "double" pillar, the thickness of which is equal to the sum of the upper gap, the lower gap and the thickness of the membrane 152*a*. The pillar(s) 104 and the residual layer 104' reduce parasitic capacitances between the upper portions 153*a*, 154*a* and the lower portions 153*b*-154*b* of the counter-electrodes.

Alternatively, the capacitive detection system 15' may comprise a single (lower or upper) counter-electrode, two upper and lower counter-electrodes but located on one side of the pivot hinges 16 (pseudo-differential detection), or two lower or upper counter-electrodes disposed on either side of the pivot hinges 16 (differential detection).

As previously indicated, sealing between the first and second zones 11-12 of the electromechanical system 2 may be achieved at the pivot hinges 16. As illustrated in FIGS. 4A and 4C, each pivot hinge 16 comprises a sealed insulation element 161, which is capable of elastic deformation under the effect of the rotational displacement of the transmission device 14'. The sealed insulation element 161 is in an embodiment in the form of a sealing membrane.

Each sealed insulation element 161 has in an embodiment an associated second member 145 of the transmission device 14' passing therethrough. The sealed insulation element 161 extends, for example, from the associated second element 145 to the lower portions 153*b*-154*b* of the counter-electrodes 153-154 (see FIG. 4A) and to the first portions 101 of the frame 10 (see FIG. 4C), to which it is anchored by means of the annular seals 103, 105 of electrically insulating material.

In addition, each pivot hinge 16 beneficially comprises the two torsion blades 162 previously described, with reference to FIG. 2. The torsion blades 162 are dimensioned so as to be torsionally deformed and allow rotation of the transmission device 14' and the movable electrode 152, while limiting their translational movements, in particular along the third direction Z (so-called "out-of-plane" translation). The two torsion blades 162 connect the rigidifying structure 152*b* of the movable electrode 152 (fused to the second element 145 of the transmission device 14') to the first portions 101 of the frame 10 (see also FIG. 4C). They are in an embodiment aligned and disposed diametrically opposite to the first beam 1521 associated with the pivot hinge 16.

The electromechanical system 2 comprises an elastic device connected to the movable electrode 152 and configured to generate an elastic force that opposes the movement of the movable electrode 152. The role of the elastic device is to counteract the pull-in phenomenon of the movable electrode 152. The stiffness of the elastic device influences the pull-in voltage of the system, and therefore the ability to bias the movable electrode 152, but also the energy losses.

The "anti-pull-in" elastic device connects (mechanically) the rigidifying structure 152*b* of the movable electrode 152 to the frame 10 and/or to elements secured to the frame, such as the counter-electrodes 153-154, possibly via the second elements 145 of the transmission device 14'. Thus, the stiffness of the transmission device 14' or the stiffness of the rigidifying structure 152*b* itself are not considered as "anti-pull-in" elastic device.

The elastic "anti-pull-in" device here comprises the sealed insulation elements 161 and, if applicable, the torsion blades 162. In this way, the sealed insulation elements 161 and the torsion blades 162 fulfil several functions simultaneously.

The anti-pull-in elastic device is connected to the rigidifying structure 152*b* where it is most rigid, namely at the pivot hinges 16. Thus, the stiffness of the anti-pull-in elastic device is not degraded by serial elements of too low stiffness. This stiffness can also be easily controlled by adjusting the dimensions of the sealed insulation elements 161 and the torsion blades 162. The sealed insulation elements 161 can be defined by anisotropic etching of a sacrificial layer (for example of $SiO_2$) and are made in a structural layer of controlled thickness. This type of etching allows good control of the dimensions of the sealed insulation elements 161. As a result, the stiffness of the sealed insulation elements 161 has a low dispersion (mainly between different electromechanical systems manufactured on a same wafer or on different wafers).

The sealed insulation elements 161 and, if applicable, the torsion blades 162, beneficially constitute the only "anti-pull-in" device of the electromechanical system 2. Thus, the electromechanical system 2 is particularly compact.

Figure 5:
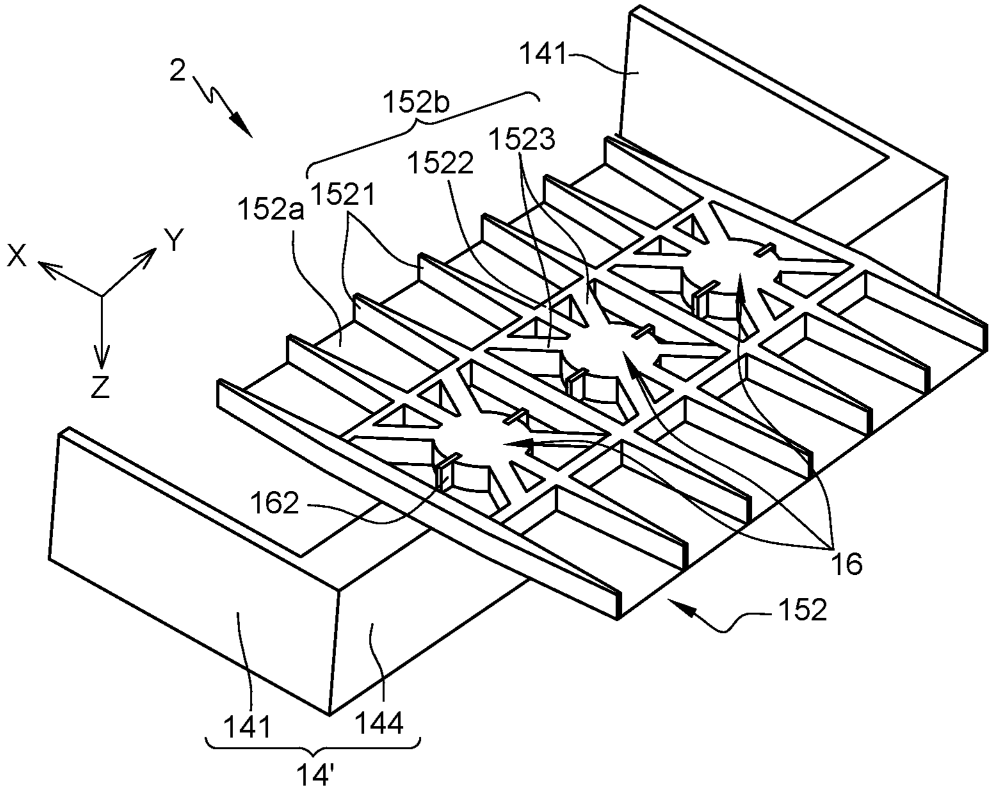
FIG. 5 is a partial perspective view of an electromechanical system according to a second embodiment of the invention.
Figure 6:
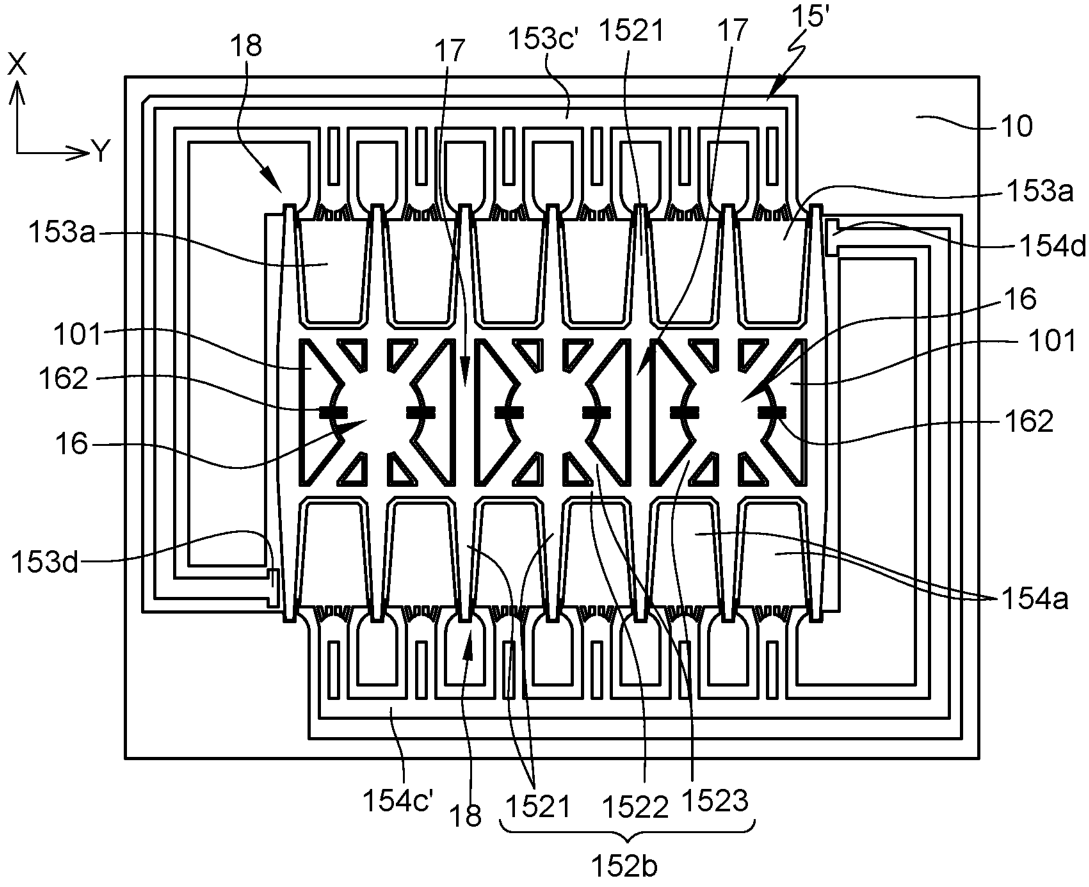
FIG. 6 is a top view of the electromechanical system of FIG. 5, showing part of the capacitive detection or actuation system.

FIGS. 5 and 6 represent a second embodiment of the electromechanical system 2. FIG. 5 is a perspective view of part of the electromechanical system 2, similar to that of FIG. 2. FIG. 5 is a top view, similar to FIG. 3, showing the capacitive detection system 15' (except for the lower portions of the counter-electrodes).

This second embodiment differs from the first embodiment essentially in the design of the capacitive detection system 15'. The transmission device 14' is especially identical to that of FIG. 2 (transmission arm 141 and transverse beam 144) and the pivot hinges 16 are constructed as described in connection with FIGS. 4A-4C (sealed insulation elements and torsion blades 162).

The rigidifying structure **152*b* of the movable electrode 152 still comprises first beams 1521, but more than the number of pivot hinges 16 used to anchor the movable electrode 152. Thus, some first beams 1521 are not fused to the transmission device 14'. They extend along the longitudinal edges (lengthwise, that is along the first direction X) of the movable electrode 152 or between two successive pivot hinges 16**.

The second beams 1522 no longer connect the first beams 1521 at their ends, but closer to the pivot hinges 16, for example halfway between the axis of rotation (passing through the torsion blades 162) and the transverse edge of the movable electrode 152.

In addition to increasing width of the first beams 1521 at the pivot hinges 16 (see FIG. 6), or alternatively, oblique beams 1533 are added to the first beams 1521 fused with the transmission device 14' to draw cross braces, further increasing the stiffness of the rigidifying structure **152*b* at the pivot hinges 16** (where it is most stressed).

The space 17 between two successive hinges 16 is occupied by one or more first beams 1521 (not fused to the transmission device 14'), which makes it desirable to modify the way the upper and lower portions of the counter-electrodes 153-154 are connected.

With reference to FIG. 6, the different blocks of the upper portion **153*a* of the first counter-electrode 153 are electrically connected to each other through a first conductive track 153*c*' which extends at the periphery of the movable electrode 152. This first so-called external conductive track 153*c*' bypasses the movable electrode 152 up to the first conductive via 153*d* to connect to the lower portion of the first counter-electrode 153, located on the other side of the pivot hinges 16. Similarly, the individual blocks of the upper portion 154*a* of the second counter-electrode 154 are electrically connected to each other through a second conductive track 154*c*' which extends at the periphery of the movable electrode 152 to the second conductive via 154*b***.

In a manner common to both embodiments (see FIGS. 3 and 6), the electromechanical system 2 may comprise a system 18 for stopping pull-in of the membrane **152*a* of the movable electrode 152, before it is bonded to one of the counter-electrodes, when the bias voltage of the movable electrode 152 is such that the electrostatic force becomes greater than the elastic force (in other words in case of a pull-in). The system is 18 located at one end or the ends of one or more first beams 1521, and in an embodiment all first beams 1521, and comprise, for example, stops. Their main purpose is to prevent degradation to the movable electrode 152** due to a short-circuit event with a counter-electrode.

Figure 7:
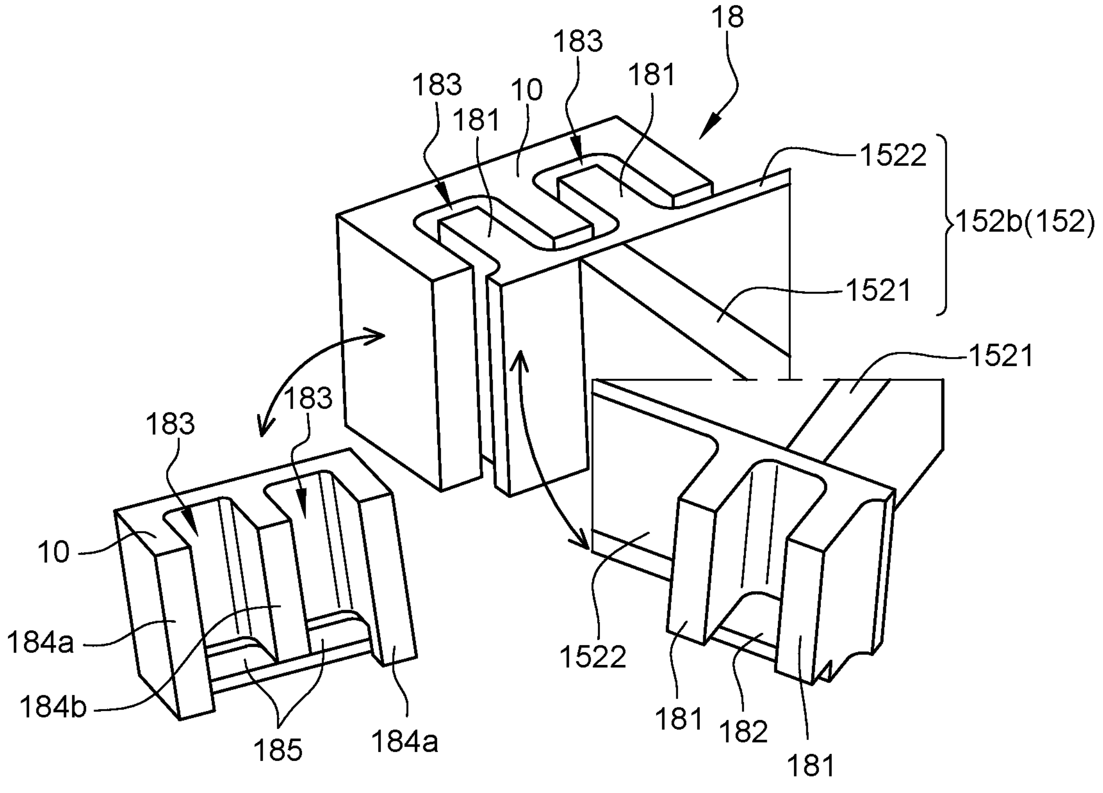
FIG. 7 is a perspective view of a system to prevent degradation of the capacitive detection or actuation system in the electromechanical system of FIG. 2 or FIG. 5.

FIG. 7 represents one exemplary embodiment of the system 18 for preventing pull-in of the movable electrode 152. The rigidifying structure **152*b* of the movable electrode 152 comprises at the end of the first beam 1521 two fingers 181 and a membrane 182 connecting the two fingers 181 at one of their ends. The frame 10 comprises two cavities 183, laterally delimited by two external fingers 184*a* and an internal finger 184*b* (disposed between the external fingers 184*a*), and two membranes 185 forming the bottom of the cavities 183. The fingers 181 of the rigidifying structure 152*b* are disposed inside the cavities 183 of the frame 10**.

Depending on the direction of movement (rotation) of the movable electrode 152, either the fingers 181 of the rigidifying structure **152*b* abut the membranes 185 of the frame 10, or the membrane 182 of the rigidifying structure 152*b* abuts the internal finger 184*b* of the frame 10**.

The electromechanical system 2 described above can be manufactured using methods described in patents FR3059659B1 and FR3114584B1, especially by starting from a stack of layers comprising successively a substrate, a first sacrificial layer and a first structural layer. The stack may in particular be a multilayer structure of the silicon-on-insulator (SOI) type, commonly known as an SOI substrate.

The substrate is used in particular to make, by etching, the first elements of the transmission device 14' (transmission arm 141 and transverse beam 144), the lower portions **153*b*-154*b* of the counter-electrodes 153-154 and a part of the frame 10**. The substrate may be of a semiconductor material, for example silicon.

The first structural layer is used in particular to produce the membrane 131 of the piston 13, the membrane **152*a* of the movable electrode 152, the sealed insulation elements 161 (sealing membranes) and the membranes 182 and 185 of the system 18 for preventing pull-in of the movable electrode 152**. It has a thickness less than that of the substrate, in an embodiment between 100 nm and 10 μm, for example equal to 1 μm. It is, in an embodiment, made of the same material as the substrate, for example silicon.

The first sacrificial layer is intended to partly disappear during the manufacture of the electromechanical system 2 in order to release the membrane 131 of the piston 13, the membrane **152*a* of the movable electrode 152 and the sealed insulation elements 161. Its thickness especially defines the distance between the membrane 152*a* of the movable electrode 152 and the lower portions 153*b*-154*b* of the counter-electrodes 153-154 (lower gap). This layer also serves as a stop layer when etching the substrate, the membrane 152*a*, and the second structural layer (the so-called "MEMS" layer subsequently described). The remaining parts of the first sacrificial layer form the annular seals 103, 105 and the lower pillars 104**. The first sacrificial layer can be made of a dielectric material, in an embodiment a silicon nitride or a silicon oxide, for example silicon dioxide ($SiO_2$). Its thickness is for example between 100 nm and 10 μm.

As described in the aforementioned patents, a second sacrificial layer is deposited onto the first structural layer and a second structural layer is formed on the second sacrificial layer, in an embodiment by epitaxy.

The second structural layer is etched to delimit the rigidifying structure 132 of the piston 13, the rigidifying structure **152*b* of the movable electrode 152, the torsion blades 162, the upper portions 153*a*-153*b* of the counter-electrodes 153-154, the first portions 101 and the second annular portion 102 of the frame 10**. Beneficially, it is formed by the same material as the first structural layer, for example silicon. The thickness of the second structural layer is in an embodiment between 5 μm and 50 μm, for example 20 μm.

The rigidifying structure **152*b* of the movable electrode 152 is fused to the transmission device 14' by growing the second structural layer directly from the substrate at the location of the pivot hinges 16 (the first and second sacrificial layers having been opened beforehand). The second elements 145 of the transmission device 14'** are formed during this epitaxial growth.

In particular, the second sacrificial layer serves as a stop layer upon etching of the second structural layer. It is partly removed to release the piston membrane 131, the movable electrode membrane **152*a* and the sealed insulation elements 161. Its thickness defines the distance between the membrane 152***a* of the movable electrode 152 and the upper portions 153*a*-154*a* of the counter-electrodes 153-154 (upper gap). The second sacrificial layer is beneficially formed by the same dielectric material as the first sacrificial layer, for example a silicon oxide. Its thickness may be between 100 nm and 10 μm.

The electromechanical system according to the invention is not limited to the embodiments described in connection with FIGS. 2 to 7 and many variants and modifications of the electromechanical system will become apparent to the skilled person.

The transmission device 14' may especially assume other configurations than that described in connection with FIG. 2. For example, the transmission device 14' may comprise a transmission shaft having a longitudinal axis of rotation and a plurality of transmission arms, each of the transmission arms comprising a first end coupled to the piston and a second end secured to the transmission shaft. The rigidifying structure of the movable electrode is secured to the transmission shaft (in the same way as with the transverse beam 144). The movable electrode is thereby rotatably movably mounted about the first longitudinal axis of rotation. The transmission arms, in an embodiment, extend perpendicularly to the transmission shaft. The piston may be rotatably or translationally movable (relative to the frame).

The electromechanical system 2 may comprise one or more additional pivot hinges, not represented in the figures, which are not fused to the rigidifying structure 152*b* of the movable electrode 152 (for example pivot hinges located at the end of the transmission arms 141, as is represented in FIG. 1).

The electromechanical system 2 has been described using as an example a capacitive detection microphone comprising a piston 13 with a membrane 131 subjected on the one hand to atmospheric pressure and on the other hand to a reference pressure. However, the electromechanical system can form other types of capacitive detection transducer, such as a loudspeaker (sound emitter) or an ultrasonic emitter (which are electroacoustic transducers), or even a differential pressure sensor.

In the case of a differential pressure sensor, the first side of the membrane 131 is subjected to a first pressure (not necessarily atmospheric pressure) and the second side of the membrane 131 is subjected to a second pressure, different from the first pressure. The displacement of the membrane 131 under the effect of the pressure difference is measured by the capacitive detection system 15'. The membrane 131 of the piston is fixed to the frame 10 so as to be sealed and the rigidifying structure 132 of the piston is absent or reduced so as not to anchor it to the frame.

In the case of a loudspeaker or ultrasonic transmitter, capacitive actuation system replaces the capacitive detection system 15'. The capacitive actuation system also comprises a movable electrode and at least one counter-electrode. The movable electrode is moved by an electrostatic force and this movement is transmitted by the transmission device 14' to the piston 13. The movement of the membrane 131 of the piston 13 enables the emission of a sound (or ultrasound).

The first and second sealingly insulated zones 11-12 are not necessarily subjected to different pressures. The first zone 11 may also be an aggressive environment and the movable electrode of the capacitive (detection or actuation) system is placed in the second zone 12 to protect it from this aggressive environment (in addition to reducing viscous friction, and thus acoustic noise).

The electromechanical system 2 may even be devoid of any sealing system between the first and second zones 11-12 (which amounts to considering only one zone). More particularly, the pivot hinges 16 may be devoid of a sealed insulation element 161. Indeed, the torsion blades 162 may suffice for the rotation of the transmission device 14' and as elastic "anti-pull-in" device.

The articles "a" and "an" may be employed in connection with various elements, components, processes or structures described herein. This is merely for convenience and to give a general sense of the compositions, processes or structures. Such a description includes "one or at least one" of the elements, components, processes or structures. Moreover, as used herein, the singular articles also include a description of a plurality of elements or components, unless it is apparent from a specific context that the plural is excluded.

It will be appreciated that the various embodiments and aspects of the inventions described previously are combinable according to any technically permissible combinations.

The invention claimed is:

1. An electromechanical system comprising:

a frame;

an element movable relative to the frame, in contact with a first zone;

a capacitive measurement or actuation system comprising an electrode movable relative to the frame, located in a second zone which is sealingly insulated from the first zone, and at least one electrode fixed relative to the frame, forming a counter-electrode, the movable electrode comprising a membrane and a membrane rigidifying structure;

a transmission device for transmitting movement between the movable element and the movable electrode, the transmission device being rotatably movable relative to the frame by a plurality of pivot hinges; and an elastic device connected to the movable electrode and configured to generate an elastic force which opposes movement of the movable electrode;

wherein the membrane rigidifying structure of the movable electrode is secured to the transmission device and anchored to the transmission device at at least one part of the pivot hinges.

2. The electromechanical system according to claim 1, wherein the transmission device comprises first elements extending in the first zone and second elements partly extending in the first zone and partly in the second zone, and wherein the rigidifying structure of the movable electrode is connected to the first elements of the transmission device through the second elements.

3. The electromechanical system according to claim 2, wherein the first elements of the transmission device have a thickness of between 5 μm and 800 μm.

4. The electromechanical system according to claim 3, wherein the first elements of the transmission device have a thickness of between 50 μm and 200 μm.

5. The electromechanical system according to claim 2, wherein the first elements of the transmission device comprise two transmission arms and a transverse beam connecting the two transmission arms, each of the transmission arms comprising a first end coupled to the movable element and a second end secured to the transverse beam.

6. The electromechanical system according to claim 1, wherein the rigidifying structure of the movable electrode comprises a plurality of beams extending in parallel to each other and wherein at least one part of the beams is anchored to the transmission device, each beam of said at least one part being anchored at a pivot hinge corresponding to said beam.

7. The electromechanical system according to claim 6, wherein each beam of said at least one part is anchored to the transmission device at half its length.

8. The electromechanical system according to claim 6, wherein each beam of said at least one part has a width that decreases with the distance from the corresponding pivot hinge.

9. The electromechanical system according to claim 6, wherein the number of beams is greater than or equal to the number of pivot hinges of said at least one part.

10. The electromechanical system according to claim 6, further comprising a system configured to stop pull-in of the movable electrode before the movable electrode touches the fixed electrode and creates a short circuit, said system being located at one end or the ends of one or more beams.

11. The electromechanical system according to claim 1, wherein each pivot hinge of said at least one part comprises a sealed insulation element capable of elastic deformation and ensuring sealing between the first zone and the second zone, said elastic device comprising the sealed insulation element of said at least one part of the pivot hinges.

12. The electromechanical system according to claim 11, wherein each pivot hinge of said at least one part further comprises two torsion blades each extending between a portion of the frame and the rigidifying structure of the movable electrode, said elastic device further comprising the torsion blades of said at least one part of the pivot hinges.

13. The electromechanical system according to claim 1, wherein the capacitive measurement or actuation system comprises two counter-electrodes fixed relative to the frame, at least one part of the membrane of the movable electrode being located between the two counter-electrodes.

14. The electromechanical system according to claim 13, wherein each counter-electrode comprises a first portion and a second portion located on either side of the membrane and either side of the pivot hinges of said at least one part, the first and second portions of each counter-electrode being electrically connected.

15. The electromechanical system according to claim 14, wherein the first portion of each counter-electrode comprises a plurality of blocks separated by the rigidifying structure of the movable electrode and wherein each block of the first portion is electrically connected to the second portion of the counter-electrode by a connector passing between two successive pivot hinges of said at least one part.

16. The electromechanical system according to claim 1, wherein the pivot hinges of said at least one part are aligned with each other.

* * * * *